United States Patent

[11] 3,557,995

| [72] | Inventors | Salustiana S. Mirasol, Jr.<br>Kansas City;<br>George E. MacEwen, Gladstone, Mo. |
|---|---|---|
| [21] | Appl. No. | 774,946 |
| [22] | Filed | Nov. 12, 1968 |
| [45] | Patented | Jan. 26, 1971 |
| [73] | Assignee | Phillips Petroleum Company<br>a corporation of Delaware |

[54] UPWARDLY EXPANSIBLE PLASTIC VENTED LID
6 Claims, 7 Drawing Figs.

[52] U.S. Cl. ...................................................... 220/42,
229/43, 229/1.5, 220/44, 220/97
[51] Int. Cl. ...................................................... B65d 41/20,
B65d 41/06
[50] Field of Search ........................................ 220/441,
60, 97, 42; 229/43, 1.5B; 150/.5

[56] References Cited
UNITED STATES PATENTS

| 3,283,939 | 11/1966 | Miller ........................... | 220/44 |
| 3,362,575 | 1/1968 | Fotos ............................ | 229/43 |

*Primary Examiner*—George T. Hall
*Attorney*—Young and Quigg

ABSTRACT: A plastic lid is provided with an inverted U-shaped rim adapted to fit on the open ends of a plurality of containers having differently shaped ends, said lid having a vent, and an annular groove with radial-shaped groove arms permitting the lid to bulge upwardly and relieve internal pressure when the lid is forced on a container, but maintaining the top of the lid in a horizontal position when a plurality of filled and lidded containers are stacked one upon another, with the base of one container on the lid of another container.

INVENTORS
S.S. MIRASOL, JR
G.E. MacEWEN

BY *Young & Quigg*

ATTORNEYS

UPWARDLY EXPANSIBLE PLASTIC VENTED LID

DISCLOSURE

This invention relates to lids which are fitted on containers containing materials that may evolve gaseous pressure. These lids allow the gaseous pressure to bulge the top of the lid upwardly momentarily while the internal gaseous pressure is relieved through a vent, but prevent the top of the lid from moving downwardly into a concave configuration that would be deleterious to stacking containers.

A plastic lid is provided with an inverted U-shaped rim adapted to fit on the open ends of a plurality of containers having differently shaped ends, said lid having a vent, and an annular groove with radial-shaped groove arms, permitting the lid to bulge upwardly and relieve internal pressure when the lid is forced on a container, but maintaining the top of the lid in a horizontal position when a plurality of filled and lidded containers are stacked one upon another, with the base of one container on the lid of another container.

In the prior are, difficulties have been experienced in supplying hot coffee from a cafe or restaurant to employees of companies with offices in high buildings. The coffee must be at or near its boiling point when placed in the fiber, plastic or paperboard containers, because it must still be very hot when it reaches the final customer sometime later. Therefore, the coffee is giving off steam, the gaseous pressure of which must for a time be relieved, so it is covered with a lid which will not pop off and which will allow venting of gaseous pressure especially at the moment of installation of the lid on the container. Then the lid must not move downwardly into a concavity which would make the containers hard to stack in piles, but must instead be stiff and horizontal so that a plurality of the filled containers can be stacked with the base of one on the top of another for transportation in a compact array through such small spaces as passenger elevators, or the like. In such cities as New York, the supplying of coffee for coffee breaks is a large-scale business for numerous restaurants.

Figure 1:
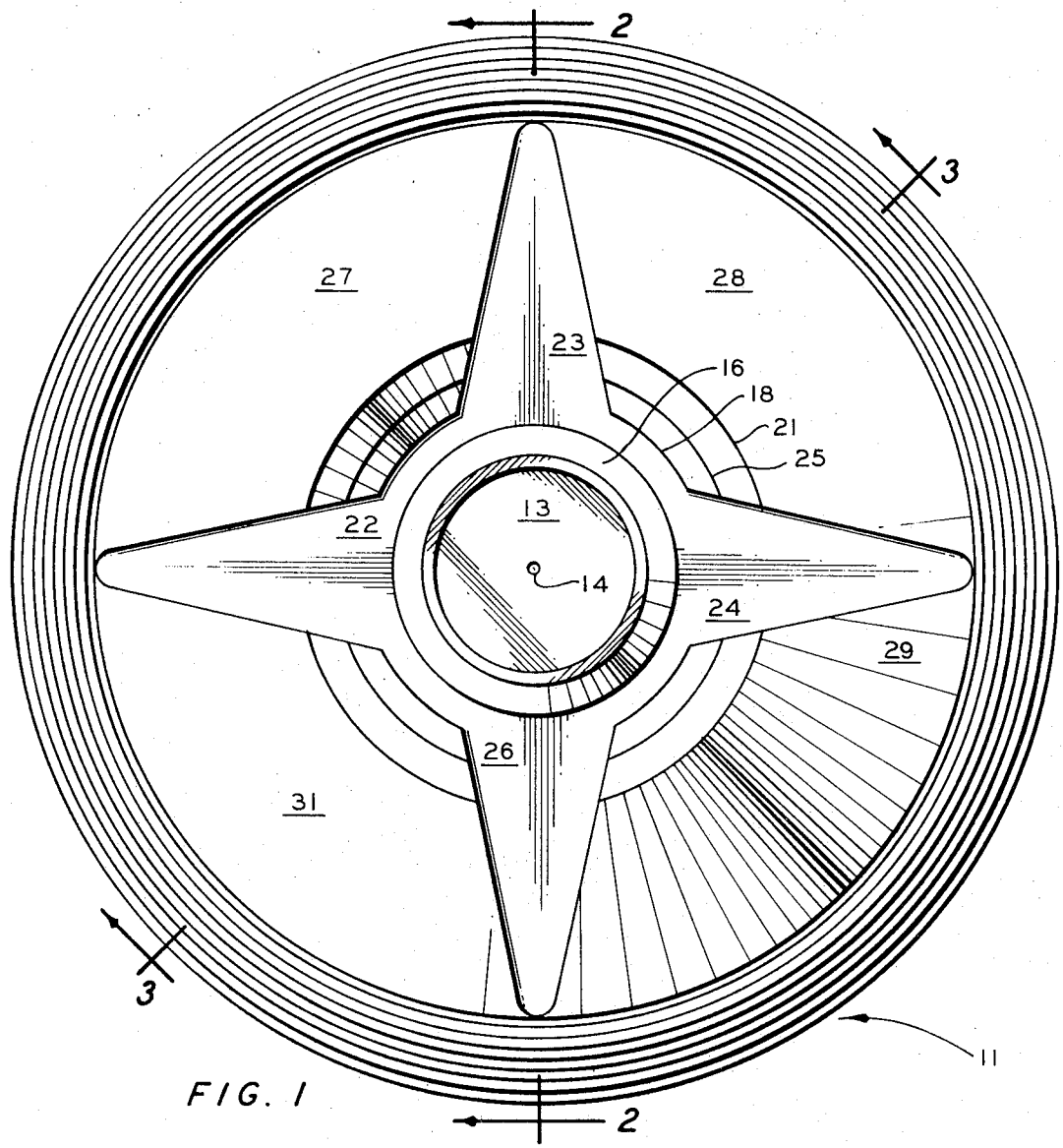
FIG. 1 is a plan view of the top of a container lid with an annular groove with radial star-shaped groove arms embodying the present invention.
Figure 3:
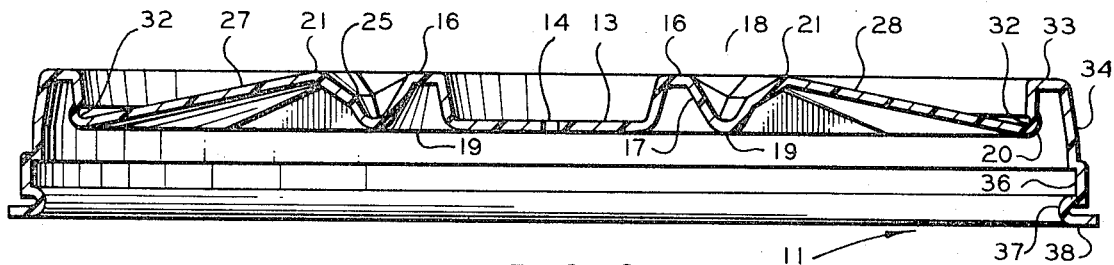

FIR FIG. 3 is a cross-sectional view taken along the line 3–3 of FIG. 1 along the axis of a raised portion of the lid between two of the arms of the star-shaped groove.

Figures 4, 5, 6:
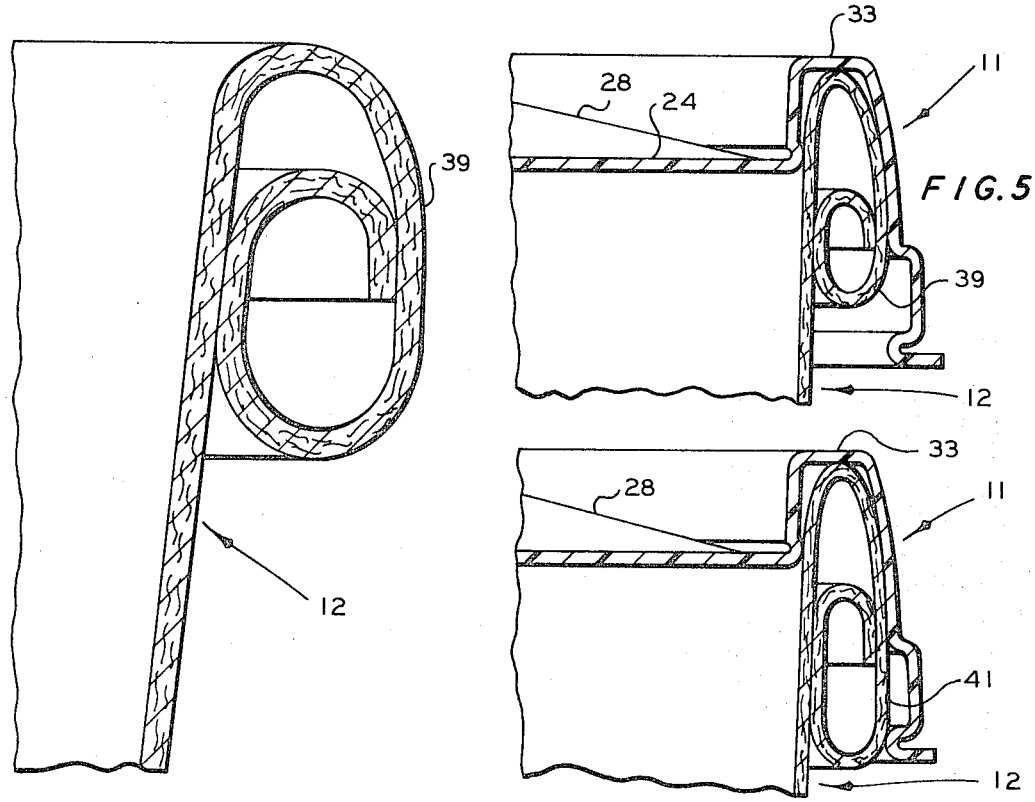

FIG. 4 is a cross-sectional view of a top portion of a paperboard cup showing a relatively short folded rim.

Figure 2:
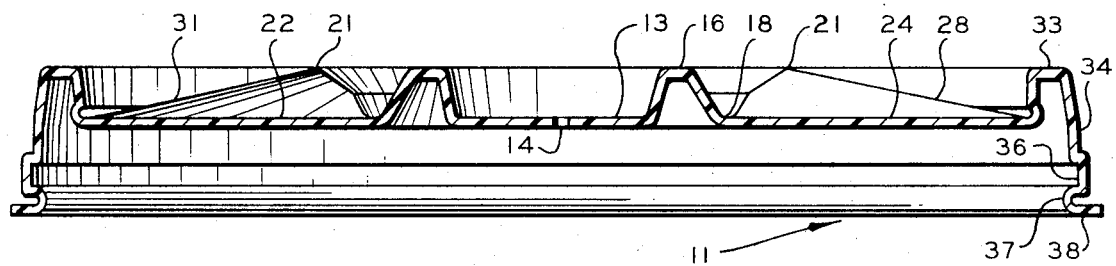
FIG. 2 is a cross-sectional view taken along the line 2–2 of FIG. 1 along the axis of one of the radial arms of the star-shaped groove.

FIG. 5 is a cross-sectional view of the lid of FIG. 2 forced down on and deforming the rim of the cup of FIG. 4 as the lid closes the top of the cup.

FIG. 6 is a view similar to FIG. 5 in which a cup having a relatively long folded rim is similarly closed by the same lid.

Figure 7:
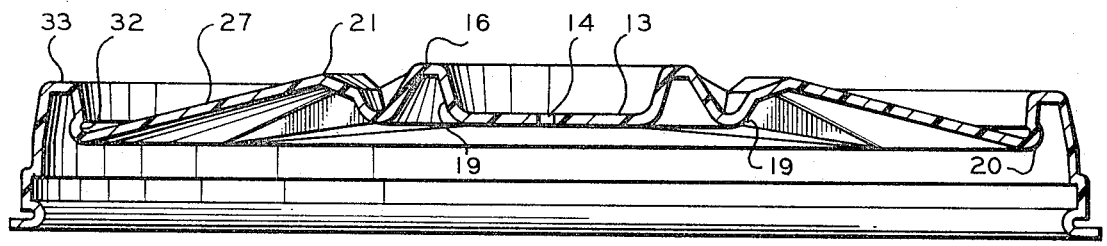

FIG. 7 is a view similar to FIG. 3, but showing how the lid can bulge upwardly under gaseous pressure during attachment of the lid to the cup, but after the pressure bleeds out the vent the lid will return to the position of FIG. 3 and will not bend down concavely when one or more filled containers are stacked on top of the lid.

This invention obviously applies to covering containers for all hot liquids at or near their boiling point and therefore evolving gas. Coffee, hot water, tea, cocoa, chocolate, hydrocarbons, alcohols, ethers, esters and other industrial liquids that are substantially nonsolvent of the lid and the container may be contained in this manner at or near their respective boiling points. At present the best market is for hot beverages, but the invention is not limited thereto.

Any suitable plastic material may be used for the lid generally designated as 11 in FIG. 1. Polyethylene, polypropylene, copolymers of polyethylene and polypropylene, polystyrene, polybutadiene, copolymers of polybutadiene and polystyrene, or copolymers of any number of monomers including ethylene, propylene, butadiene, styrene, and other olefins and diolefins of two to 10 carbon atoms can be used. Presently preferred is a butadiene styrene copolymer known as high-impact styrene. Such plastics are obtainable from a number of sources on the open market. High impact styrene can be made according to U.S. Pat. to Morris et al. No. 2,606,163 for "Interpolymers of Styrene with Styrene-Butadiene Copolymers." Polyvinyl chloride, especially high-impact polyvinyl chloride, can be used. U.S. Pat. No. 2,460,3000 to Le Fevre et al. and U.S. Pat. No. 2,694,692 to Amos et al. give other suitable plastics.

The conventional rolltop frustoconical cardboard, or paperboard, or plastic container generally designated as 12 in FIG. 4 can be made solely of any of the materials mentioned in the preceding paragraph, or it can be made of any suitable fiber, cardboard, paperboard or the like. It can be coated on either or both sides with any of the plastics listed in the preceding paragraph, and preferably is so coated on the inside to contain hot liquid coffee. Polyethylene coating is presently preferred. Such polyethylene-coated paperboard containers are conventional and available on the open market.

Comparing FIGS. 1 and 3, it will be noted that lid 11 is provided with a central, flat, circular diaphragm 13 perforated with a central vent hole 14. The lid around diaphragm 13 is provided with a first upwardly extending annular ridge 16 forming below a first annular inverted, U-shaped groove 17. Passing outwardly, the lid then has an annular groove 18 forming below a second annular, downwardly extending ridge 19. Ridge 19 normally lies in the same horizontal plane as edge 20. From groove 18 the lid rises again to an annular, upwardly extending ridge 21 which, however, is dissected by a series of radial groove arms 22, 23, 24 and 26 lying in the same plane as annular groove 18. The lid surfaces 27, 28, 29 and 31 slope down from ridge 21 to reach the same level of the ends of arms 22, 23, 24 and 26 in groove 32. If desired, an intermediate bend 25 can be placed between groove 18 and ridge 21, but while this facilitates bending the lid it is not regarded as essential. Around the periphery or circumference of this flexible portion 22, 23, 24, 26, 27, 28, 29 and 31 is an inverted, U-shaped, annular rim 33 having a dependent skirt portion 34 extending below groove 32. To stiffen the skirt 34, there is an annular groove 36 followed by an annular internal ridge 37 and annular external flange 38.

As shown in FIGS. 5 and 6, the lid 11 will fit on the top of cup 12 whether it has a short rolled edge 39 or a long rolled edge 41. Parts 33, 34, 36, 37 and 38 will obviously seal off most any type of cup edge that is in present commercial use, as several sealing surfaces are presented, at least one of which will operate.

FIG. 7 shows how the diaphragm will bulge up under gaseous pressure compared to FIG. 3. This is usually only momentarily, as the lid is first pushed on the cup of very hot or boiling coffee. The gaseous pressure evolving from the coffee rapidly vents through hole 14 and the lid returns to the position of FIG. 3. However, it will not bulge downward. Because of the fact that it will not bulge downward, as many as six filled containers can be stacked with the bottom of one resting on the lid of the one below. This enables a large number of these filled containers to be stacked in a small space and transported on a cart or by other means to the place of distribution which may be a long way off.

The present invention unexpectedly solves the problem of lids popping off just after they have been pushed on the containers, and allows the liquid being packaged to be at least 10° F. hotter when the lids are applied without the lids popping off, all because of the small additional space available when the lid bulges upwardly instead of popping off. The vent then relieves the pressure, and the lid top returns to horizontal either before or after stacking a plurality of containers one on another for transport. This difference of being at least 10° F. hotter results in the coffee arriving at a distant point of consumption in a much hotter and more palatable condition, which results in greater satisfaction of the consumer and repeat orders for the hot coffee.

The reason why the lid will bulge upwardly from the position of FIGS. 2 and 3 into that of FIG. 7 is because as the annular ridge 19 rises above the horizontal plane of edge 20, it is not under significant tension or compression and the annular groove 18 and the radial arm grooves 22, 23, 24 and 26 merely change their shape a small amount, becoming broader and shallower. The reason why the lid will not bulge downwardly form the position of FIG. 3 is that to do so the annular ridge 19 would have to stretch and become a larger diameter annular ridge; and in addition, the annular groove 18 and the radial arm grooves 22, 23, 24 and 26 would have to become narrower, which they cannot do since the plane surfaces 27, 28, 29 and 31 and annular ridge 19 are incapable of deforming to the extent such a downward bulging would require. It is not necessary to the disclosure of this invention that the theory of its operation be correctly explained, so long as the invention operates substantially as disclosed.

It is not necessary to the above-described operation that there be a depression at 13 inside annular ridge 16. In fact, the lid material 13 could extend from one side of 16 to the other side of 16 in the same horizontal plane with vent 14 therein. The depression at 13 merely adds some protection to vent 14 by recessing it out of contact with anything put on top of the lid, such as the bottom of another container 12.

While a preferred form of the invention has been shown as an example for illustrative purposes, it is believed obvious that the invention is not limited thereto. For example, while only four radial grooves are preferred as shown, there could just as well be only two or three, or as many as 12 radial grooves, and the invention would still operate the same way, although operation with only two radial grooves would be inferior in that upward bulging would be reduced.

These upwardly expansible plastic vented lids 11 may be easily thermoformed by conventional means known to the art. A heated mold may contact both sides and compress them into shape. Preferably, they are vacuum thermoformed, a conventional process in which a heated plastic sheet is placed over a lower half mold of the desired shape, and the air between the plastic sheet and the mold evacuated to suck the plastic down into the shape of the mold. Hole 14 is cut later, or pressure can force the plastic sheet into the mold. All these methods and means of thermoforming are well known in the art and need not be explained further here.

We claim:

1. A circular plastic lid having a flexible central portion and means around its circumference to seal it to the top of a container, comprising in combination:

a downwardly extending concentric annular groove formed in said central portion intermediate the center and circumference thereof;

a plurality of downwardly extending radial grooves formed in the central portion extending in communication with the annular groove and extending radially outwardly and growing shallower as they approach said circumference; and a small venthole perforating said flexible central portion.

2. The lid of claim 1 in which inside the annular groove there is a central depressed portion, and the venthole is located in the depressed portion.

3. The lid of claim 1 in which the means around its circumference to seal it to the top of a container is an annular concentric inverted U-shaped rim.

4. The lid of claim 1 in which there are three to 12 radial grooves.

5. The lid of claim 1 in which there are four radial grooves.

6. The lid of claim 3 in which the outer edge of the rim is formed with a downwardly extending skirt having an outwardly extending annular groove and an annular external flange.